US012229170B1

(12) United States Patent
Fung et al.

(10) Patent No.: US 12,229,170 B1
(45) Date of Patent: Feb. 18, 2025

(54) VALIDATION AGAINST AGGREGATION ACROSS DIFFERENT VERSIONS OF DATA

(71) Applicant: SAP SE, Walldorf (DE)

(72) Inventors: Alfred Fung, Burnaby (CA); Semuel Kadarusman, Burnaby (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/468,447

(22) Filed: Sep. 15, 2023

Related U.S. Application Data

(60) Provisional application No. 63/516,717, filed on Jul. 31, 2023.

(51) Int. Cl.
   *G06F 16/28* (2019.01)
   *G06F 16/215* (2019.01)
   *G06F 16/26* (2019.01)

(52) U.S. Cl.
   CPC .......... *G06F 16/287* (2019.01); *G06F 16/215* (2019.01); *G06F 16/26* (2019.01)

(58) Field of Classification Search
   CPC ....... G06F 16/287; G06F 16/215; G06F 16/26
   See application file for complete search history.

(56) References Cited

U.S. PATENT DOCUMENTS

2020/0092695 A1\* 3/2020 Vigeant .................... H04N 7/15
2020/0401581 A1\* 12/2020 Eubank ............... G06F 16/2282

\* cited by examiner

*Primary Examiner* — Apu M Mofiz
*Assistant Examiner* — Cindy Nguyen
(74) *Attorney, Agent, or Firm* — Fountainhead Law Group, PC

(57) ABSTRACT

Techniques for validation against aggregation across different versions of data obtain a selection of a data set, a dimension configuration for a data visualization, and a filter configuration for the data visualization. Then it is determined whether the data visualization is valid based on a determination that the zero or more filter dimensions include the version dimension, or a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The data visualization is generated in response to a determination that the data visualization is valid.

17 Claims, 8 Drawing Sheets

VALIDATION AGAINST AGGREGATION ACROSS DIFFERENT VERSIONS OF DATA

CROSS-REFERENCE TO RELATED APPLICATION

The present application claims the benefit and priority of U.S. Provisional Application No. 63/516,717 filed Jul. 31, 2023, entitled "Validation Against Aggregation Across Different Versions of Data," the entire contents of which are incorporated herein by reference in its entirety for all purposes.

BACKGROUND

The present disclosure relates to data analytics and planning and in particular to data analytics software that visualizes data which can have different versions.

In certain data analytics software applications, an end user may use the application to access data as demanded and visualize the data in one or more charts, graphs, geographic maps, tables, or other visualizations. These visualizations may enable the user to make planning decisions, obtain predictive analytics, or identify outliers and other interesting insights from the data, for example. Certain data analytics applications may allow a dataset to be selected, dimensions to be bound, filters to be applied, and various different types of visualizations to be selected such that the visualizations are be generated and rendered in the application's user interface.

While such customizations are useful in enabling the user to gain insights from the data and make planning decisions, these customizations may also allow the user to cause the visualization to present the data in a way that is misleading or in an otherwise invalid state. For instance, a user may generate graphs to visualize different versions of the data (e.g., a predicted forecast version of the data and an actual recorded version of the data). However, it would be misleading if the chart numerically aggregated these two versions together since they are different versions of the same data. For instance, it would not normally be appropriate to aggregate a predicted forecast number with an actually recorded number.

It would be advantageous to provide the user with more configuration options for generating visualizations of data while still notifying the user if the visualization would be put into an invalid or misleading state.

The present disclosure addresses these issue and others, as further described below.

SUMMARY

The present disclosure provides a computer system. The computer system includes one or more processors and one or more machine-readable medium coupled to the one or more processors. The one or more machine-readable medium store computer program code comprising sets instructions. The instructions are executable by the one or more processors to obtain a selection of a data set. The data set comprises a plurality of data fields organized by a plurality of rows and a plurality of dimensions. The plurality of dimensions include measurable dimensions and categorical dimensions. The fields within the measurable dimensions contain numerical values. The fields within the categorical dimensions contain categorical values. The plurality of dimensions include a version dimension. The fields of the version dimension indicate a version of data from among multiple versions of the same data. The instructions are further executable by the one or more processors to obtain a dimension configuration for a data visualization. The dimension configuration indicating zero or more selected dimensions selected from the plurality of dimensions. The selected dimensions are selected to be included in the data visualization. The instructions are further executable by the one or more processors to obtain a filter configuration for the data visualization. The filter configuration indicates zero or more filter dimensions selected from the plurality of dimensions. The filter dimensions selected to filter at least a portion of the data set from the data visualization. The instructions are further executable by the one or more processors to determine whether the data visualization is valid based on a determination that the zero or more filter dimensions include the version dimension, a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The instructions are further executable by the one or more processors to generate the data visualization in response to a determination that the data visualization is valid.

The present disclosure provides one or more non-transitory computer-readable medium storing computer program code. The computer program code includes sets of instructions to obtain a selection of a data set. The data set comprises a plurality of data fields organized by a plurality of rows and a plurality of dimensions. The plurality of dimensions include measurable dimensions and categorical dimensions. The fields within the measurable dimensions contain numerical values. The fields within the categorical dimensions contain categorical values. The plurality of dimensions include a version dimension. The fields of the version dimension indicate a version of data from among multiple versions of the same data. The computer program code further includes sets of instructions to obtain a dimension configuration for a data visualization. The dimension configuration indicating zero or more selected dimensions selected from the plurality of dimensions. The selected dimensions are selected to be included in the data visualization. The computer program code further includes sets of instructions to obtain a filter configuration for the data visualization. The filter configuration indicates zero or more filter dimensions selected from the plurality of dimensions. The filter dimensions selected to filter at least a portion of the data set from the data visualization. The computer program code further includes sets of instructions to determine whether the data visualization is valid based on a determination that the zero or more filter dimensions include the version dimension, a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The computer program code further includes sets of instructions to generate the data visualization in response to a determination that the data visualization is valid.

The present disclosure further provides a computer-implemented method. The method includes obtaining a selection of a data set. The data set comprises a plurality of data fields organized by a plurality of rows and a plurality of dimensions. The plurality of dimensions include measurable dimensions and categorical dimensions. The fields within the measurable dimensions contain numerical values. The fields within the categorical dimensions contain categorical values. The plurality of dimensions include a version dimension. The fields of the version dimension indicate a version of data from among multiple versions of the same data. The method further includes obtaining a dimension configuration for a data visualization. The dimension configuration indicating zero or more selected dimensions selected from the plurality of dimensions. The selected dimensions are selected to be included in the data visualization. The method further includes obtaining a filter configuration for the data visualization. The filter configuration indicates zero or more filter dimensions selected from the plurality of dimensions. The filter dimensions selected to filter at least a portion of the data set from the data visualization. The method further includes determining whether the data visualization is valid based on a determination that the zero or more filter dimensions include the version dimension, a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The method further includes generating the data visualization in response to a determination that the data visualization is valid.

The following detailed description and accompanying drawings provide a better understanding of the nature and advantages of the present disclosure.

DETAILED DESCRIPTION

Figure 1:
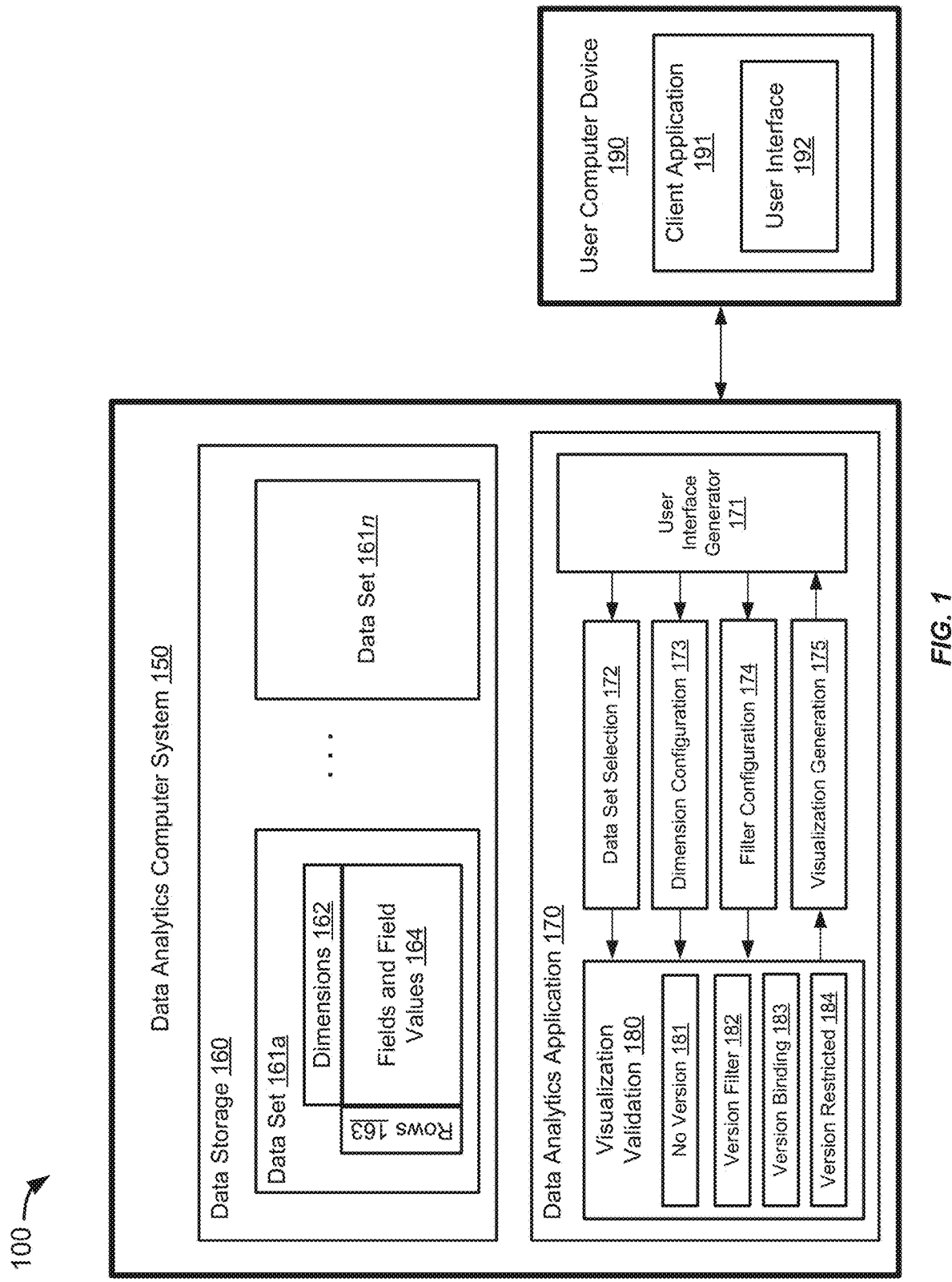
FIG. 1 shows a diagram of validation against aggregation across different versions of data, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, in certain data analytics software applications an end user may use the application to access data as demanded and visualize the data in one or more charts, graphs, geographic maps, tables, or other visualizations. These visualizations may enable the user to make planning decisions, obtain predictive analytics, or identify outliers and other interesting insights from the data, for example. Certain data analytics applications may allow a dataset to be selected, dimensions to be bound, filters to be applied, and various different types of visualizations to be selected such that the visualizations are be generated and rendered in the application's user interface.

While such customizations are useful in enabling the user to gain insights from the data and make planning decisions, these customizations may also allow the user to cause the visualization to present the data in a way that is misleading or in an otherwise invalid state. For instance, a user may generate graphs to visualize different versions of the data (e.g., a predicted forecast version of the data and an actual recorded version of the data). However, it would be misleading if the chart numerically aggregated these two versions together since they are different versions of the same data. For instance, it would not normally be appropriate to aggregate a predicted forecast number with an actually recorded number.

Figure 4:
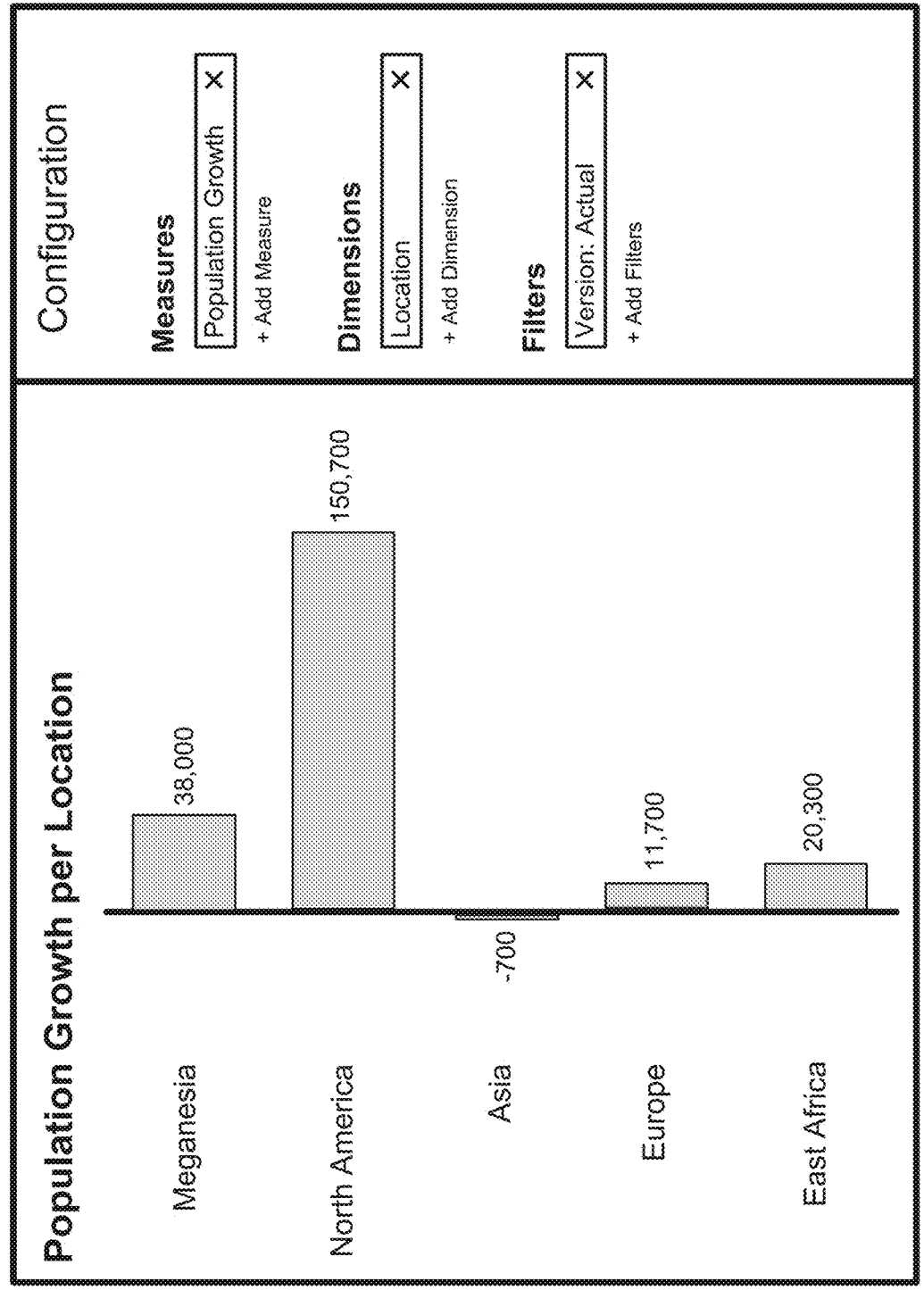
FIG. 4 illustrates a user interface of a data analytics application showing a chart of population growth by location being filtered by a version, according to an embodiment.

It may be possible for different versions of data to become aggregated when version is a dimension as data analytics may be configured or programmed to separate or aggregate numerical values of measurable dimensions by categorical dimensions. An introductory example is now provided while further details are given below. As an example, FIG. 4 shows a data visualization of a population growth data set. In FIG. 4, the data visualization includes "location" as dimension of a bar chart. The bar chart shows population growth (a measurable dimension) by location (a categorical dimension). The members of the location dimension include Meganesia, North America, Asia, Europe, and East Africa.

Accordingly, each of these members is represented by a bar within the bar chart. If location were removed as a dimension, then it would make sense to aggregate the values for each of these locations together into a single value, which represents the combined population growth across all locations).

Figure 6:
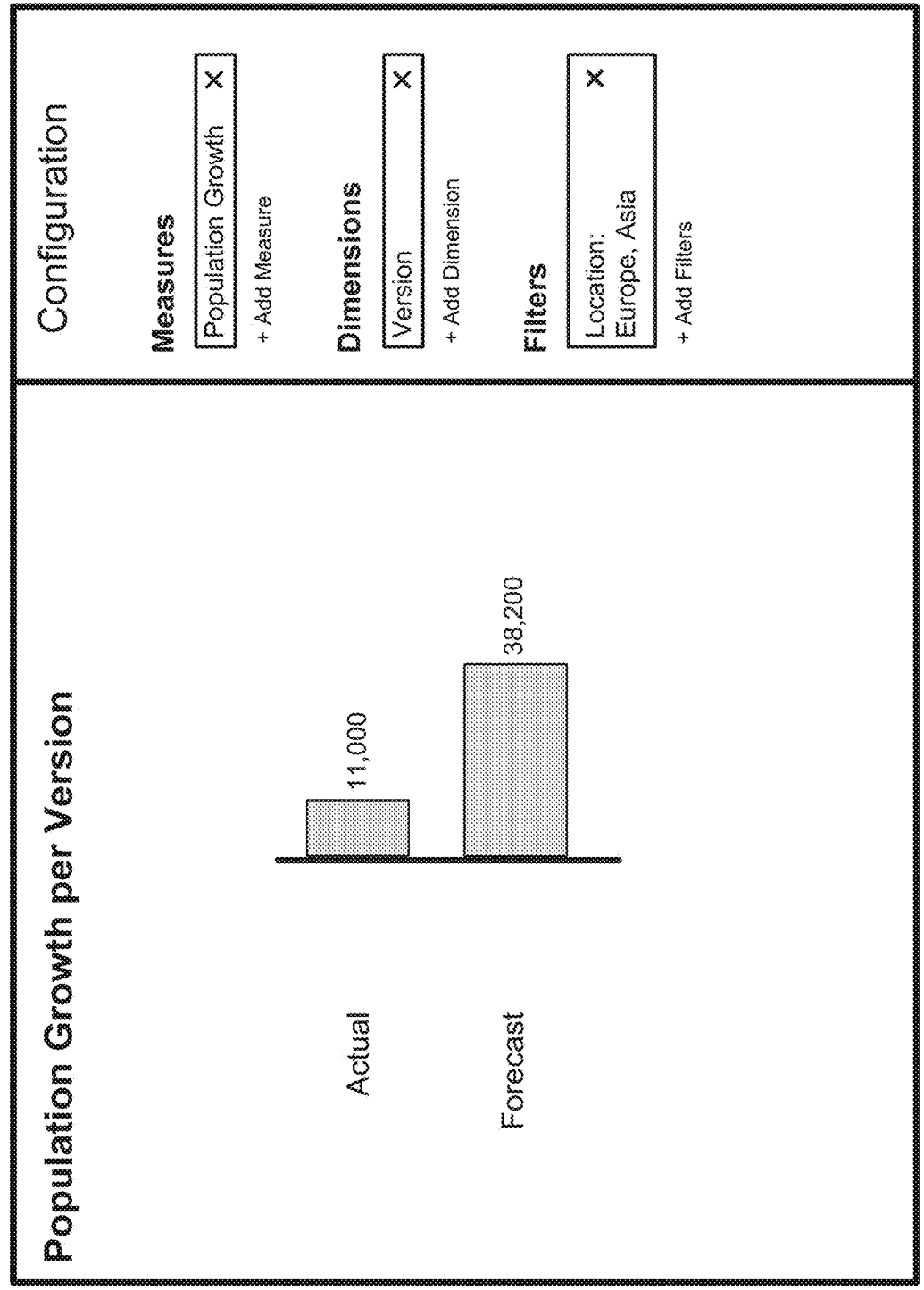
FIG. 6 illustrates a user interface of a data analytics application showing a chart of population growth by version being filtered by locations, according to an embodiment.

However, it does not make sense to aggregate values across a dimension when the dimension refers to different versions of the same data. For instance, predictions of data may be made and stored as a "forecast" version while the actual recorded measurements of data may be stored as an "actual" version of the data. As an example, FIG. 6 shows population growth per version, with an actual version and a forecast version of the population growth. If version were removed as a dimension, it may not make sense to sense to aggregate the values for the actual version of the population growth data with the forecast version of the population growth data. And performing such aggregation may be misleading to the user if they do not notice that different versions of the same data have been combined.

It would be advantageous to provide the user with more configuration options for generating visualizations of data while still notifying the user if the visualization would be put into an invalid or misleading state. The present disclosure provides techniques for validation against aggregation across different versions of data, which addresses the issues above and provides the advantages just mentioned.

FIG. 1 shows a diagram 100 of validation against aggregation across different versions of data, according to an embodiment. The validation is performed by a data analytics computer system 150. Specifically, the validation (i.e., visualization validation 180) is performed by a data analytics software application 170 operated by the data analytics computer system 150. The data analytics computer system 150 may include one or more computing machines such as server computers. The data analytics computer system 150 may be part of a cloud computer system or part of an on-premise computer system, for example.

The data analytics computer system 150 includes data storage 160 which stores data sets, including data set 161a-n. Each data set 161 is a collection of data, which may be presented in a table. The data sets 161 include a plurality of data fields 164 having values. In general, a field may refer to an element of a table that contains a single piece of data. In some embodiments, fields 164 are organized into rows 163, which contain all the data relevant for one specific entry in the table.

As shown in FIG. 1, the fields 164 are organized by a plurality of rows 163 and a plurality of dimensions 162. The plurality of dimensions 162 include measurable dimensions and categorical dimensions. The fields within the measurable dimensions contain numerical values (e.g., decimal numbers or integer numbers). Such measurable dimensions may also be referred to as "measures." In general, measures contain numeric values and typically represent quantities that provide meaning to the data set 161. For example, population growth, sales revenue, salary, or number of employees. Values of measures may be derived from one or more columns of a table, and they may be the basis for aggregation and analysis.

Fields within the categorical dimensions contain categorical values. Categorical values may have data types of date, integer, decimal, string, time, date, or Boolean, for example. Such categorical dimensions may also be referred to as "dimensions" (as opposed to "measures"). In general, dimensions represent categories that provide perspective on the data set 161. For example, location, product category, or date. Each dimension may be organized into a parent-child hierarchy or a hierarchy of levels. For example, a geography dimension or location dimension may include levels for continent, country, state, and city.

In this example, the plurality of dimensions 162 include a version dimension (not specifically shown but it is included in dimensions 162 in FIG. 1). The fields of the version dimension indicate a version of data from among multiple versions of the same data.

The data analytics application 170 includes a user interface software component 171. The user interface generator software component 171 is configured to generate user interfaces for the data analytics application 170 to be rendered or presented on a user interface 192 of a client application 191 operating on a user computer device 190. For example, a user's desktop computer or smartphone may operate a Web browser application having a user interface that enables the user to access the data analytics application 170. The user computer device 190 is configured to communicate with the data analytics computer system 150 (e.g., over the Internet or another network).

The data analytics application 170 also includes a data set selection software component 172, a dimension configuration software component 173, a filter configuration software component 174, a visualization generation software component 175, and a visualization validation software component 180.

The data set selection software component 172 is configured to obtain a selection of a particular data set 161a-n, such as the dataset 161a. The selections may be made by a user of the user computer device 190.

The dimension configuration software component 173 is configured to obtain a dimension configuration for a data visualization. The dimension configuration indicates zero or more selected dimensions selected from the plurality of dimensions 162. The selected dimensions are selected to be included in the data visualization. The selected dimension may be selected or modified using a configuration panel presented in the user interface.

The filter configuration software component 174 is configured to obtain a filter configuration for the data visualization. The filter configuration indicates zero or more filter dimensions selected from the plurality of dimensions 162. The filter dimensions are selected to filter at least a portion of the data set 161 from the data visualization. In general, a "filter" refers to a set of criteria that restricts the data returned (e.g., from the data set or as the result of a query). With filters, the user can define which subset of data appears in the result set, which is used for generating the data visualization.

The visualization validation software component 180 is configured to determine whether the data visualization is valid. In some embodiments, the visualization validation software component 180 may be configured to make a determination 181 of whether there is no version dimension in the data. If version is not a dimension of the data, then there is no potential issue with aggregating across versions. If version is a dimension of the data, then validation is performed. This validation is based on one of the following determinations being made.

1. A determination 182 that the zero or more filter dimensions include the version dimension,
2. A determination 183 that the zero or more selected dimensions include the version dimension, or
3. A determination 184 that the zero or more selected dimensions include at least one of the measurable dimensions and that all measurable dimensions of the selected dimensions are restricted to a single version of data from among the multiple versions of the same data.

A dimension that restricts a measure may be referred to as a "restricted measure." A restricted measure may be a user-created calculation that restricts a measure in a particular way. For example, a restricted measure may restrict a "Population Growth" measure on location "Asia" and "Europe" such that data for a location "North America" does not appear in a chart or other visualization showing the Population Growth data. As another example, a restricted measure may restrict Population Growth data on an "Actual" version of the data such that the visualization for Population Growth does not show data for a "Forecast" version of that same data. When Population Growth is restricted to the Actual version and not to any other version, this is an example of a measurable dimension being restricted to a single version of data from among multiple versions of the same data as in the $3^{rd}$ validation determination above. In this Population Growth example, even if there are no filters on version and the version dimension is not bound in the visualization (e.g., not selected to appear in the visualization), but all the measures are restricted with version, then the chart will still be valid. Further details and examples of validation are provided below.

The visualization generation software component 175 is configured to generate the data visualization. The data visualization may be a chart or graph, such as a bar chart, a line graph, or a geographical map, for example. As a further example, if the data visualization is a bar chart, the generation of the data visualization includes generating bars in the bar chart for each of the selected dimensions selected to be included in the data visualization.

The visualization generation software component 175 is configured to generate the data visualization in response to a determination that the data visualization is valid. The visualization generation software component 175 may obtain a result indication that the data visualization is valid or invalid from the visualization validation software component 180.

Figure 7:
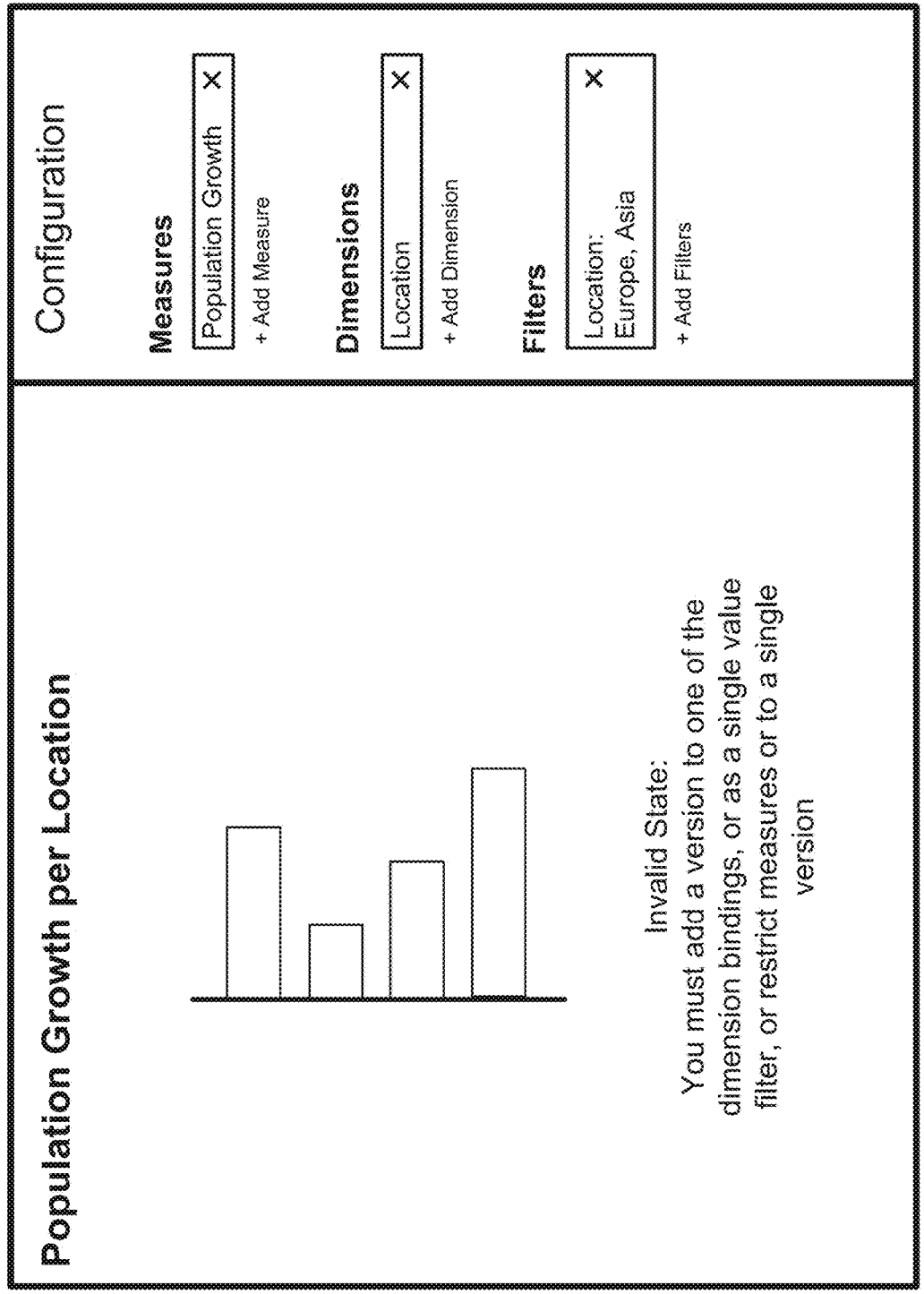
FIG. 7 illustrates a user interface of a data analytics application showing an invalid state notification when the chart does not include version and is not filtered by a version, according to an embodiment.

The visualization generation software component 175 is configured to generate an invalid state notification in response to the determination that the data visualization is invalid. The invalid state notification may include text indicating to add the version dimension to the selected dimensions selected to be included in the data visualization, to add the version dimension to the filter dimensions, or to restrict all measurable dimensions of the selected dimensions are restricted to one of the multiple versions. An example of such a notification is shown in FIG. 7.

The data analytics software application 170 is also configured to obtain modifications to the dimension configuration or to the filter configuration. The modifications may add the version dimension to the selected dimensions, add the version dimension to the filter dimensions, or restrict all measurable dimensions of the selected dimensions to one of the multiple versions. Upon receiving a modification to a configuration, the data analytics software application 170 is configured to re-determine whether the visualization is valid using the visualization validation component 180. For instance, the visualization validation component 180 may determine that the data visualization is valid based on a determination that the zero or more filter dimensions of the filter configuration as modified include the version dimension, a determination that the zero or more selected dimensions of the dimension configuration as modified include the version dimension, or a determination that the zero or more selected dimensions of the dimension configuration as modified include at least one of the measurable dimensions and that all measurable dimensions of the selected dimensions are restricted to a single version of data from among the multiple versions of the same data. When the data visualization is valid, the generation of the data visualization is performed in response to that determination and the visualization is generated based on the filter configuration as modified or based on the dimension configuration as modified.

The data analytics software application 170 is also configured to generate a user interface including the data visualization and generate a configuration panel in the user interface including user interface elements to input the modifications to the dimension configuration or to the filter configuration.

The data analytics software application 170 is also configured to obtain, from the user via the user interface 192, the input of the modifications to the dimension configuration or to the filter configuration.

In some embodiments, the data analytics software application is configured to aggregate numerical values of a given measurable dimension for a given categorical dimension when performing the generation of the data visualization unless the given categorical dimension is selected to be included in the data visualization, the given categorical dimension is selected to filter at least the portion of the data set, or the data visualization is determined to be invalid based on the dimension configuration or the filter configuration.

Figure 2:
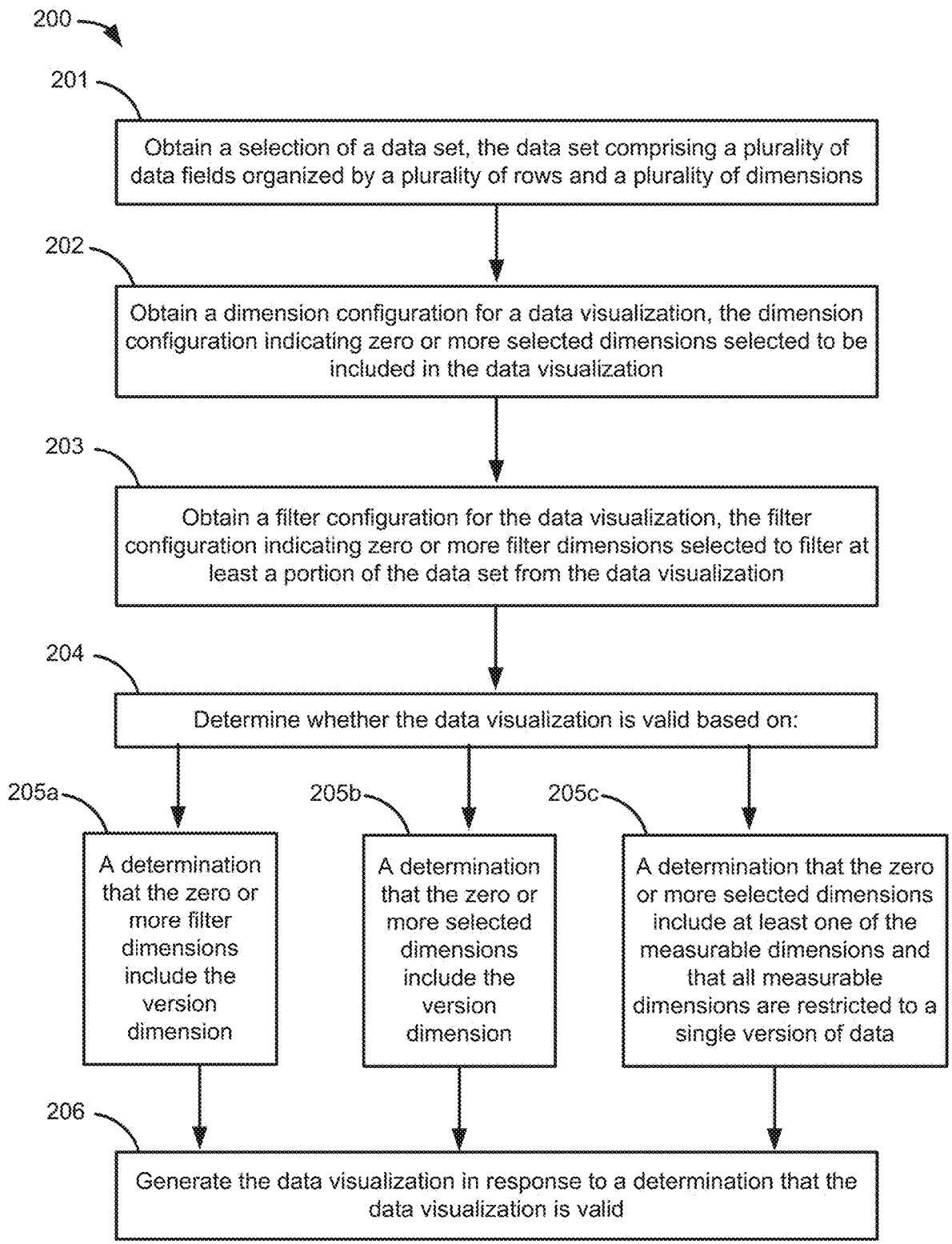
FIG. 2 shows a flowchart of a computer implemented method, according to an embodiment.

FIG. 2 shows a flowchart 200 of a computer-implemented method, according to an embodiment. The computer-implemented method may be performed by a computer system such as the data analytics computer system 150 described above with respect to FIG. 1. The computer-implemented method may be performed using computer hardware such as the computer hardware described below with respect to FIG. 8. The ordering of the computer-implemented method may be modified unless otherwise noted.

At 201, obtain a selection of a data set, the data set comprising a plurality of data fields organized by a plurality of rows and a plurality of dimensions, the plurality of dimensions including measurable dimensions and categorical dimensions, fields within the measurable dimensions containing numerical values, fields within the categorical dimensions containing categorical values, the plurality of dimensions including a version dimension, fields of the version dimension indicating a version of data from among multiple versions of the same data.

At 202, obtain a dimension configuration for a data visualization, the dimension configuration indicating zero or more selected dimensions selected from the plurality of dimensions, the selected dimensions selected to be included in the data visualization.

At 203, obtain a filter configuration for the data visualization, the filter configuration indicating zero or more filter dimensions selected from the plurality of dimensions, the filter dimensions selected to filter at least a portion of the data set from the data visualization.

At 204, determine whether the data visualization is valid. The determination is based on one or more of the following determinations.

At 205*a*, a determination that the zero or more filter dimensions include the version dimension.

At 205*b*, a determination that the zero or more selected dimensions include the version dimension.

At 205c, a determination that the zero or more selected dimensions include at least one of the measurable dimensions and that all measurable dimensions of the selected dimensions are restricted to a single version of data from among the multiple versions of the same data; and At 206, generate the data visualization in response to a determination that the data visualization is valid.

Example Implementations

Example implementations of the techniques for validation against aggregation across different versions are described below. These techniques may be implemented by a data analytics computer system or a data analytics software application as described above.

In order to ensure that data is not being aggregated across different version, validation may be performed to determine a valid states for a data visualization and invalid states for a data visualization. Various operations that may be performed on data visualizations are described below with respect to validation. In particular, version-based filters, version-based dimension bindings, and restrictions to measurable dimensions based on versions are described.

In some embodiments, a version filter is initially added to the visualization, which ensures that the visualization is in a valid state. The analytics application may enable the user to remove the version filter, which may or may not put the visualization into an invalid state depending on other factors considered by the validation techniques described here. As such, the data analytics application described herein provides advantages over certain prior analytics application which do not enable a user to remove a version filter. Thus, certain prior analytics application are more restrictive on the user and less customizable by the user as compared to the analytics application incorporating the validation techniques described herein. This validation is described below.

If the user removes the version filter and if version is bound to the visualization, the visualization can be left as is as the values will not be aggregated incorrectly.

If the user removes the version filter and if version is not bound to the chart, then measures that are not restricted on version may be considered an erroneous binding. An invalid state notification may be generated, prompting the user to put the visualization into a valid state.

The analytics application may enable the user to add the version filter after it has been removed. A version filter dialog may provide for multi-selection (instead of single select in some cases), relying on the version aggregation validation described herein to guide the user to a valid state if necessary. The filter dialog may also provide an "All Members" or "All Versions" option in addition to individual version selection for filtering.

With respect to version dimension binding (e.g., binding of the version dimension to show as bars in a bar chart), if a version binding is removed and a version filter does not exist then measures that are not restricted on version are considered an erroneous binding and can be manually removed by the user. If a version binding is removed and the version filter does exist then no change to the chart needed since that is a valid state.

It is possible to add a version binding after it has been removed. This may result in data changes.

With respect to measures and calculations, if there is no version filter or no version on the chart bindings, then adding measures is still allowed whether they restrict on version or not. However, any measures or calculation not restricting on version will be in an invalid state or an error state (e.g. if a version binding or version filter is not present). The user may be prompted with a notification to fix the visualization by making the appropriate changes (e.g., filtering on version, or adding version as a binding). Further details of valid and invalid states are described below.

Figure 3:
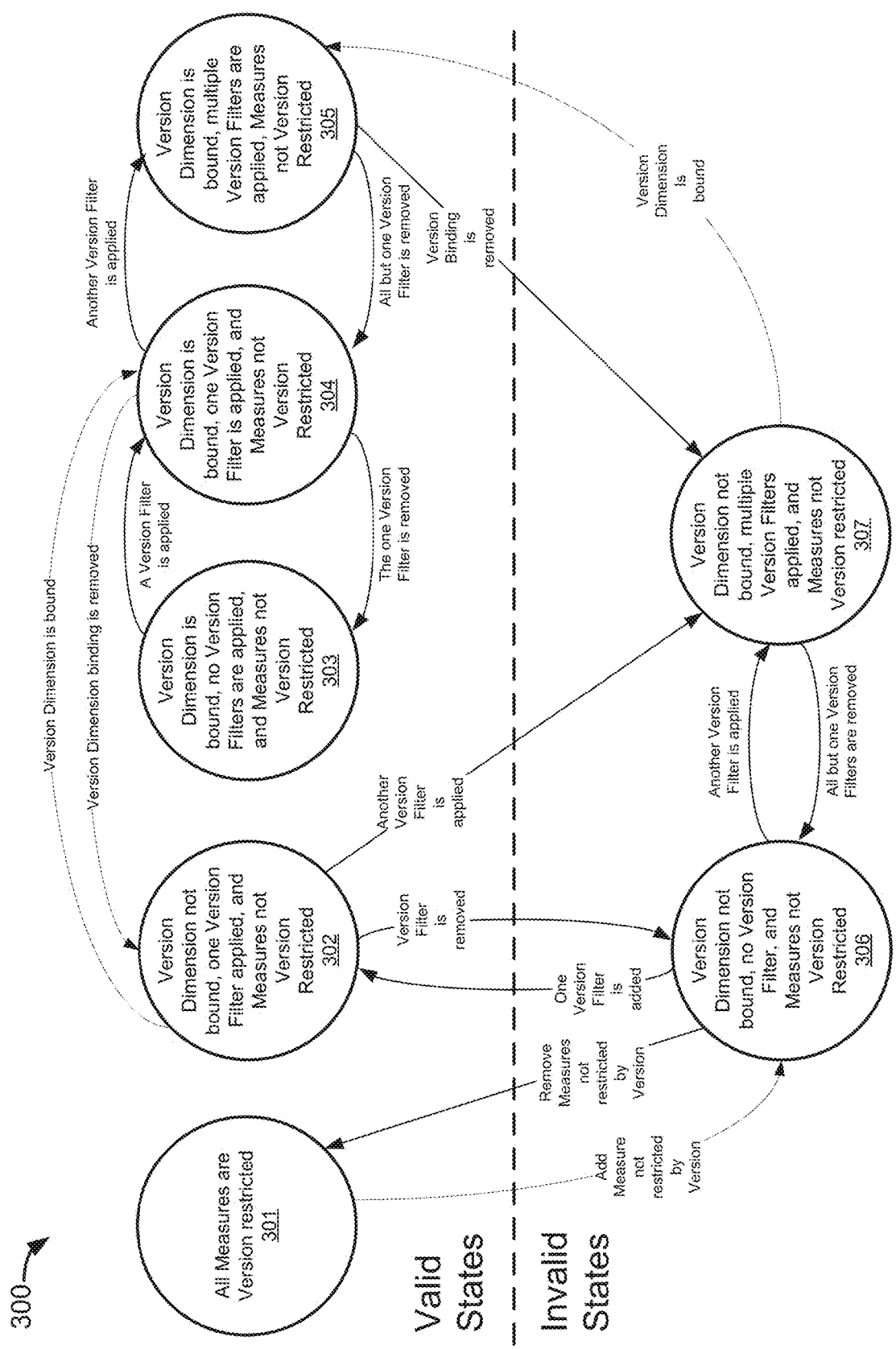
FIG. 3 shows a state diagram of valid states and invalid states for a visualization of data, according to an embodiment.

FIG. 3 shows a state diagram 300 of valid states and invalid states for a visualization of data, according to an embodiment. The valid states include a first state 301, a second state 302, a third state 303, a fourth state 304, and a fifth state, which are described below. The invalid states include a sixth state 306 and a seventh state 307, which are described below. Some of these states are discussed with respect to the user interfaces shown in FIG. 4-7.

In the valid first state 301, all measures are version restricted, whether there is a version dimension binding or not, and whether the visualization is being filtered based on version or not. If all measures are version restricted to a single version, then there is no risk of aggregating values across different versions.

In the valid second state 302, the version dimension is not bound, one version filter is applied, and all measures are not version restricted. A visualization is valid when it is filtered by one and only one version whether the version dimension is bound or not and whether or not all measures are version restricted or not. An example of the second state 302 is shown in FIG. 4 and this state is further described below with respect to FIG. 4.

In the valid third state 303, the version dimension is bound, no version filters are applied, and all measures are not version restricted. This is a valid state because version is bound as a dimension. An example of the third state 303 is shown in FIG. 6 and this state is further described below with respect to FIG. 6.

In the valid fourth state 304, the version dimension is bound, one version filter is applied, and all measures are not version restricted. This is a valid state because the version dimension is bound and because one version filter is applied.

In the valid fifth state 305, the version dimension is bound, multiple version filters are applied, and all measures are not version restricted. Even though multiple version filters are selected to be applied, this is a valid state because version is bound as a dimension such that the data for different versions will be represented as different elements within the visualization (e.g., as different bars within a bar chart).

In the invalid sixth state 306, the version dimension is not bound, no version filters are applied, and all measures are not version restricted. This is an invalid state when the data set includes multiple different versions.

In the invalid seventh state 307, the version dimension is not bound, multiple version filters are applied, and all measures are not version restricted. This is an invalid state when the data set includes multiple different versions which are applied as filters.

FIG. 4 illustrates a user interface 400 of a data analytics application showing a chart of population growth by location being filtered by a version, according to an embodiment. In the user interface 400, "location" is bound as a dimension in the population growth chart and the population growth measure from the data set is being filtered down to the "actual" version of the data (e.g., as opposed to a "forecast" version of the data). The user interface 400, shows population growth per location where the location dimension includes Meganesia, North America, Asia, Europe, and East Africa as different categories of "location." In this example, the chart is in a valid state because it is being filtered based on the "actual" version. Therefore, data is not being aggregated across version.

Figure 5:
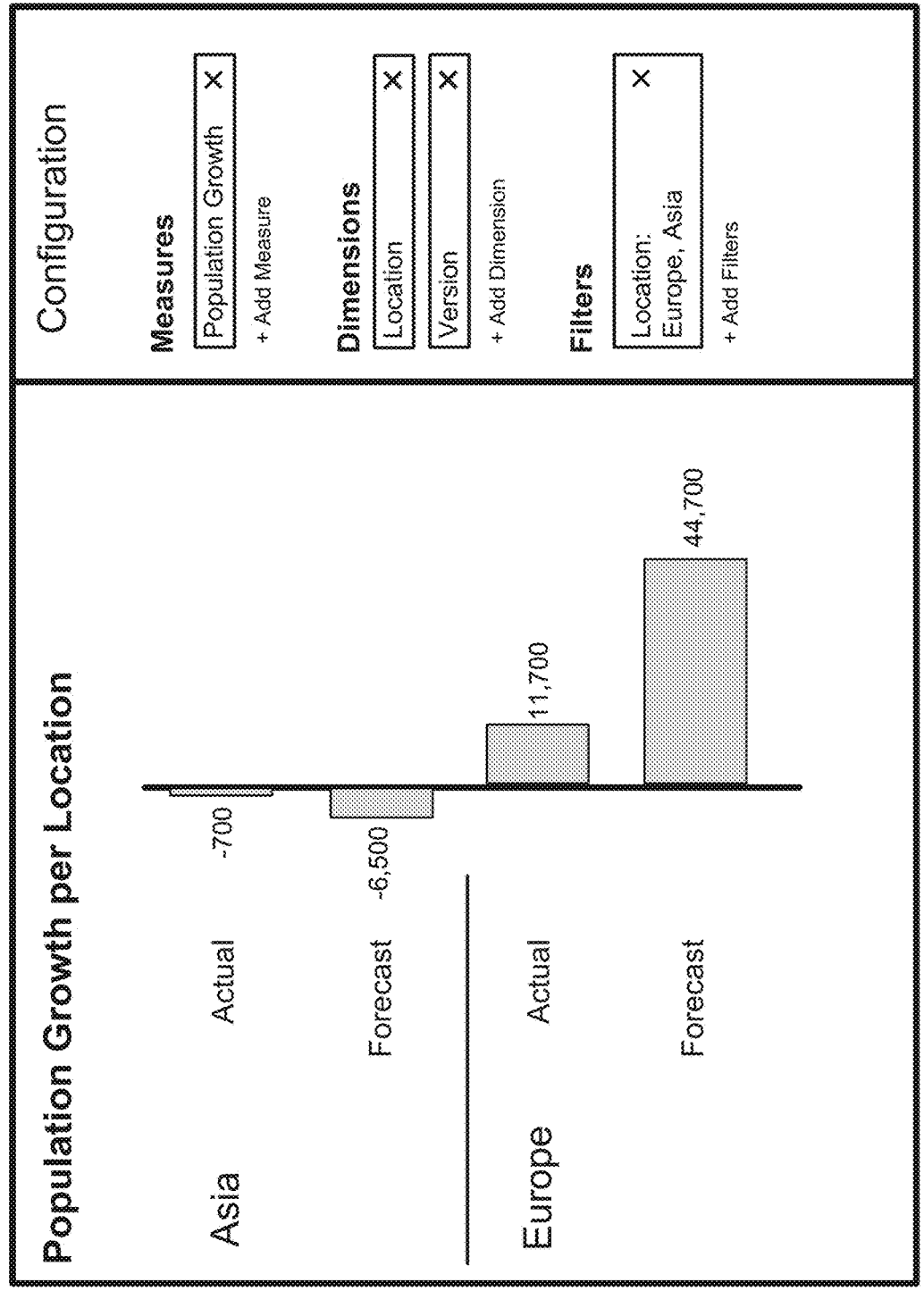
FIG. 5 illustrates a user interface of a data analytics application showing a chart of population growth by location and by version, without being filtered by a version, according to an embodiment.

FIG. 5 illustrates a user interface 500 of a data analytics application showing a chart of population growth by location and by version, without being filtered by a version, according to an embodiment. In the user interface 500, the data is being filtered by location and the locations for "Europe" and "Asia" have been selected from among the other options (see the locations in FIG. 4). Note that in the user interface 500, the version filter has been removed compared to the user interface in FIG. 4. However, the chart is in a valid state since the version dimension is bound and shows up as a bar in the chart. Note that in FIG. 5 the "actual" version and the "forecast" version are represented by separate bars for both the "Asia" location and for the "Europe" location. Therefore, data is not being aggregated across version.

FIG. 6 illustrates a user interface 600 of a data analytics application showing a chart of population growth by version being filtered by locations, according to an embodiment. As compared to FIG. 5, the "location" dimension has been removed as a dimension binding. Accordingly, location is no longer shown as bars within the chart. However, "version" is still a dimension binding and so is represented by different bars in the chart. Accordingly, this is a valid state as data is not being aggregated across version, even though the data is not being filtered based on version.

FIG. 7 illustrates a user interface 700 of a data analytics application showing an invalid state notification when the chart does not include version and is not filtered by a version, according to an embodiment. In FIG. 7, as compared with FIG. 6, the "version" dimension binding has been removed and the "location" binding has been added. However, this is an invalid state as version is not a dimension binding and the data is not being filtered by version. In this case, the location data might otherwise be aggregated across the "actual" version and the "forecast" version without the validation techniques described herein being performed.

Example Hardware

Figure 8:
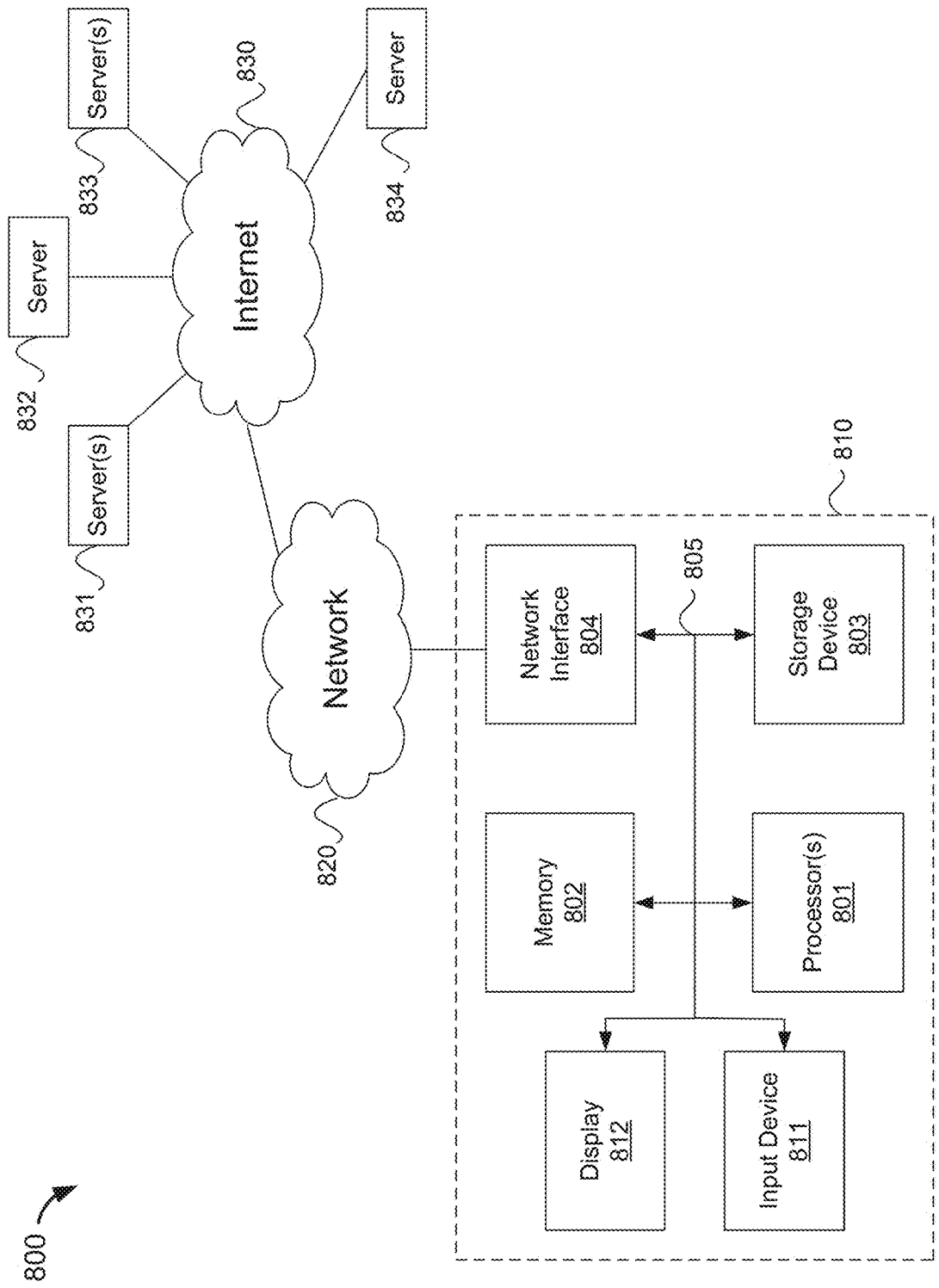
FIG. 8 shows a diagram of hardware of a special purpose computing machine for implementing systems and methods described herein.

FIG. 8 shows a diagram 800 of hardware of a special purpose computing machine for implementing the systems and methods described herein. The following hardware description is merely one example. It is to be understood that a variety of computers topologies may be used to implement the above described techniques. For instance, the computer system may implement the computer implemented method described.

An example computer system 810 is illustrated in FIG. 8. Computer system 810 includes a bus 805 or other communication mechanism for communicating information, and one or more processor(s) 801 coupled with bus 805 for processing information. Computer system 810 also includes a memory 802 coupled to bus 805 for storing information and instructions to be executed by processor 801, including information and instructions for performing some of the techniques described above, for example. This memory may also be used for storing programs executed by processor(s) 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, for example. Storage device and memory are both examples of non-transitory computer readable storage mediums. For example, the storage device 803 may store computer program code including instructions for implementing the method described above with respect to FIG. 2.

Computer system 810 may be coupled using bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

Computer system also includes a network interface 804 coupled with bus 805. Network interface 804 may provide two-way data communication between computer system 810 and a network 820. The network interface 804 may be a wireless or wired connection, for example. Computer system 810 can send and receive information through the network interface 804 across a local area network, an Intranet, a cellular network, or the Internet 830, for example. In the Internet example, a browser, for example, may access data and features on backend systems that may reside on multiple different hardware servers 831, 832, 833, 834 across the network. The servers 831-834 may be part of a cloud computing environment, for example.

Example Embodiments

The following are example embodiments of the techniques for validating against aggregation across different version of the same data.

One embodiment provides a computer system. The computer system includes one or more processors and one or more machine-readable medium coupled to the one or more processors. The one or more machine-readable medium store computer program code comprising sets instructions. The instructions are executable by the one or more processors to obtain a selection of a data set. The data set comprises a plurality of data fields organized by a plurality of rows and a plurality of dimensions. The plurality of dimensions include measurable dimensions and categorical dimensions. The fields within the measurable dimensions contain numerical values. The fields within the categorical dimensions contain categorical values. The plurality of dimensions include a version dimension. The fields of the version dimension indicate a version of data from among multiple versions of the same data. The instructions are further executable by the one or more processors to obtain a dimension configuration for a data visualization. The dimension configuration indicating zero or more selected dimensions selected from the plurality of dimensions. The selected dimensions are selected to be included in the data visualization. The instructions are further executable by the one or more processors to obtain a filter configuration for the data visualization. The filter configuration indicates zero or more filter dimensions selected from the plurality of dimensions. The filter dimensions selected to filter at least a portion of the data set from the data visualization. The instructions are further executable by the one or more processors to determine whether the data visualization is valid based on a determination that the zero or more filter dimensions include the version dimension, a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The instructions are further executable by the one or more processors to generate the data visualization in response to a determination that the data visualization is valid.

In some embodiments of the computer system, the determination of whether the data visualization is valid is a determination that the data visualization is invalid, and the computer program code further comprises sets of instructions executable by the one or more processors to generate an invalid state notification in response to the determination that the data visualization is invalid, the invalid state notification including text indicating to add the version dimension to the selected dimensions selected to be included in the data visualization, to add the version dimension to the filter dimensions, or to restrict all measurable dimensions of the selected dimensions are restricted to one of the multiple versions.

In some embodiments of the computer system, the computer program code further comprises sets of instructions executable by the one or more processors to obtain modifications to the dimension configuration or to the filter configuration, where the modifications: add the version dimension to the selected dimensions, add the version dimension to the filter dimensions, or restrict all measurable dimensions of the selected dimensions to one of the multiple versions. And where the sets of instructions are executable to determine that the data visualization is valid based on a determination that the zero or more filter dimensions of the filter configuration as modified include the version dimension, a determination that the zero or more selected dimensions of the dimension configuration as modified include the version dimension, or a determination that the zero or more selected dimensions of the dimension configuration as modified include at least one of the measurable dimensions and that all measurable dimensions of the selected dimensions are restricted to a single version of data from among the multiple versions of the same data, wherein the generation of the data visualization is performed in response to the determination that the data visualization is valid based on the filter configuration as modified or based on the dimension configuration as modified.

In some embodiments of the computer system, the computer program code further comprises sets of instructions executable by the one or more processors to: generate a user interface including the data visualization, and generate a configuration panel in the user interface including user interface elements to input the modifications to the dimension configuration or to the filter configuration.

In some embodiments of the computer system, the computer program code further comprises sets of instructions executable by the one or more processors to obtain, from a user via the user interface, the input of the modifications to the dimension configuration or to the filter configuration.

In some embodiments of the computer system, the user interface is presented by a data analytics software application, and the generation of the data visualization is performed by the data analytics software application. The data analytics software application is configured to aggregate numerical values of a given measurable dimension for a given categorical dimension when performing the generation of the data visualization unless the given categorical dimension is selected to be included in the data visualization, the given categorical dimension is selected to filter at least the portion of the data set, or the data visualization is determined to be invalid based on the dimension configuration or the filter configuration.

In some embodiments of the computer system, the data visualization is a bar chart, and the generation of the data visualization includes generating bars in the bar chart for each of the selected dimensions selected to be included in the data visualization.

Another embodiment provides one or more non-transitory computer-readable medium storing computer program code. The computer program code includes sets of instructions to obtain a selection of a data set. The data set comprises a plurality of data fields organized by a plurality of rows and a plurality of dimensions. The plurality of dimensions include measurable dimensions and categorical dimensions. The fields within the measurable dimensions contain numerical values. The fields within the categorical dimensions contain categorical values. The plurality of dimensions include a version dimension. The fields of the version dimension indicate a version of data from among multiple versions of the same data. The computer program code further includes sets of instructions to obtain a dimension configuration for a data visualization. The dimension configuration indicating zero or more selected dimensions selected from the plurality of dimensions. The selected dimensions are selected to be included in the data visualization. The computer program code further includes sets of instructions to obtain a filter configuration for the data visualization. The filter configuration indicates zero or more filter dimensions selected from the plurality of dimensions. The filter dimensions selected to filter at least a portion of the data set from the data visualization. The computer program code further includes sets of instructions to determine whether the data visualization is valid based on a determination that the zero or more filter dimensions include the version dimension, a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The computer program code further includes sets of instructions to generate the data visualization in response to a determination that the data visualization is valid.

In some embodiments of the computer-readable medium, the determination of whether the data visualization is valid is a determination that the data visualization is invalid. In such embodiments the computer program code further comprises sets of instructions to generate an invalid state notification in response to the determination that the data visualization is invalid, where the invalid state notification includes text indicating to add the version dimension to the selected dimensions selected to be included in the data visualization, to add the version dimension to the filter dimensions, or to restrict all measurable dimensions of the selected dimensions are restricted to one of the multiple versions.

In some embodiments of the computer-readable medium, the computer program code further comprises sets of instructions to obtain modifications to the dimension configuration or to the filter configuration, where the modifications add the version dimension to the selected dimensions, add the version dimension to the filter dimensions, or restrict all measurable dimensions of the selected dimensions to one of the multiple versions. In such embodiments the computer program code further comprises sets of instructions to determine that the data visualization is valid based on a determination that the zero or more filter dimensions of the filter configuration as modified include the version dimension, a determination that the zero or more selected dimensions of the dimension configuration as modified include the version dimension, or a determination that the zero or more selected dimensions of the dimension configuration as modified include at least one of the measurable dimensions and that all measurable dimensions of the selected dimensions are restricted to a single version of data from among the multiple versions of the same data, wherein the generation of the data visualization is performed in response to the determination that the data visualization is valid based on the filter configuration as modified or based on the dimension configuration as modified.

In some embodiments of the computer-readable medium, the computer program code further comprises sets of instructions to generate a user interface including the data visualization; and generate a configuration panel in the user interface including user interface elements to input the modifications to the dimension configuration or to the filter configuration.

In some embodiments of the computer-readable medium, the computer program code further comprises sets of instructions to obtain, from a user via the user interface, the input of the modifications to the dimension configuration or to the filter configuration.

In some embodiments of the computer-readable medium, the user interface is presented by a data analytics software application and the generation of the data visualization is performed by the data analytics software application. The data analytics software application is configured to aggregate numerical values of a given measurable dimension for a given categorical dimension when performing the generation of the data visualization unless the given categorical dimension is selected to be included in the data visualization, the given categorical dimension is selected to filter at least the portion of the data set, or the data visualization is determined to be invalid based on the dimension configuration or the filter configuration.

In some embodiments of the computer-readable medium, the data visualization is a bar chart, and the generation of the data visualization includes generating bars in the bar chart for each of the selected dimensions selected to be included in the data visualization.

Another embodiment provides a computer-implemented method. The method includes obtaining a selection of a data set. The data set comprises a plurality of data fields organized by a plurality of rows and a plurality of dimensions. The plurality of dimensions include measurable dimensions and categorical dimensions. The fields within the measurable dimensions contain numerical values. The fields within the categorical dimensions contain categorical values. The plurality of dimensions include a version dimension. The fields of the version dimension indicate a version of data from among multiple versions of the same data. The method further includes obtaining a dimension configuration for a data visualization. The dimension configuration indicating zero or more selected dimensions selected from the plurality of dimensions. The selected dimensions are selected to be included in the data visualization. The method further includes obtaining a filter configuration for the data visualization. The filter configuration indicates zero or more filter dimensions selected from the plurality of dimensions. The filter dimensions selected to filter at least a portion of the data set from the data visualization. The method further includes determining whether the data visualization is valid based on a determination that the zero or more filter dimensions include the version dimension, a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data. The method further includes generating the data visualization in response to a determination that the data visualization is valid.

In some embodiments of the computer-implemented method, the determination of whether the data visualization is valid is a determination that the data visualization is invalid, wherein the method further comprises generating an invalid state notification in response to the determination that the data visualization is invalid. The invalid state notification includes text indicating to add the version dimension to the selected dimensions selected to be included in the data visualization, to add the version dimension to the filter dimensions, or to restrict all measurable dimensions of the selected dimensions are restricted to one of the multiple versions.

In some embodiments of the computer-implemented method, the method further comprises obtaining modifications to the dimension configuration or to the filter configuration. The modifications add the version dimension to the selected dimensions, add the version dimension to the filter dimensions, or restrict all measurable dimensions of the selected dimensions to one of the multiple versions. In such embodiments, the method further comprises determining that the data visualization is valid based on a determination that the zero or more filter dimensions of the filter configuration as modified include the version dimension, a determination that the zero or more selected dimensions of the dimension configuration as modified include the version dimension, or a determination that the zero or more selected dimensions of the dimension configuration as modified include at least one of the measurable dimensions and that all measurable dimensions of the selected dimensions are restricted to a single version of data from among the multiple versions of the same data. The generation of the data visualization is performed in response to the determination that the data visualization is valid based on the filter configuration as modified or based on the dimension configuration as modified.

In some embodiments of the computer-implemented method, the method further comprises generating a user interface including the data visualization, generating a configuration panel in the user interface including user interface elements to input the modifications to the dimension configuration or to the filter configuration, and obtaining, from a user via the user interface, the input of the modifications to the dimension configuration or to the filter configuration.

In some embodiments of the computer-implemented method, the user interface is presented by a data analytics software application. In some embodiments the generation of the data visualization is performed by the data analytics software application. The data analytics software application is configured to aggregate numerical values of a given measurable dimension for a given categorical dimension when performing the generation of the data visualization unless the given categorical dimension is selected to be included in the data visualization, the given categorical dimension is selected to filter at least the portion of the data set, or the data visualization is determined to be invalid based on the dimension configuration or the filter configuration.

In some embodiments of the computer-implemented method, the data visualization is a bar chart, and the generation of the data visualization includes generating bars in the bar chart for each of the selected dimensions selected to be included in the data visualization.

In some embodiments the multiple versions include a forecast version and an actual version of the same data.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets instructions executable by the one or more processors to:
   obtain a selection of a data set, the data set comprising a plurality of data fields organized by a plurality of rows and a plurality of dimensions, the plurality of dimensions including measurable dimensions and categorical dimensions, fields within the measurable dimensions containing numerical values, fields within the categorical dimensions containing categorical values, the plurality of dimensions including a version dimension, fields of the version dimension indicating a version of data from among multiple versions of the same data;
   obtain a dimension configuration for a data visualization, the dimension configuration indicating zero or more selected dimensions selected from the plurality of dimensions, the selected dimensions selected to be included in the data visualization;
   obtain a filter configuration for the data visualization, the filter configuration indicating zero or more filter dimensions selected from the plurality of dimensions, the filter dimensions selected to filter at least a portion of the data set from the data visualization;
   determine whether the data visualization is valid or invalid based on:
     a determination that the zero or more filter dimensions include the version dimension,
     a determination that the zero or more selected dimensions include the version dimension, or
     a determination that the zero or more selected dimensions include at least one of the measurable dimensions and that all measurable dimensions of the selected dimensions are restricted to a single version of data from among the multiple versions of the same data;
   generate the data visualization in response to a determination that the data visualization is valid; and
   generate an invalid state notification in response to a determination that the data visualization is invalid, the invalid state notification including text indicating to add the version dimension to the selected dimensions selected to be included in the data visualization, to add the version dimension to the filter dimensions, or to restrict all measurable dimensions of the selected dimensions are restricted to one of the multiple versions.

2. The computer system of claim 1, wherein the computer program code further comprises sets of instructions executable by the one or more processors to:
   obtain modifications to the dimension configuration or to the filter configuration, wherein the modifications:
     add the version dimension to the selected dimensions,
     add the version dimension to the filter dimensions, or
     restrict all measurable dimensions of the selected dimensions to one of the multiple versions; and
   determine that the data visualization is valid based on:
     a determination that the zero or more filter dimensions of the filter configuration as modified include the version dimension,
     a determination that the zero or more selected dimensions of the dimension configuration as modified include the version dimension, or
     a determination that the zero or more selected dimensions of the dimension configuration as modified include at least one of the measurable dimensions and that all measurable dimensions of the selected dimensions are restricted to a single version of data from among the multiple versions of the same data, wherein the generation of the data visualization is performed in response to the determination that the data visualization is valid based on the filter configuration as modified or based on the dimension configuration as modified.

3. The computer system of claim 2, wherein the computer program code further comprises sets of instructions executable by the one or more processors to:
   generate a user interface including the data visualization; and
   generate a configuration panel in the user interface including user interface elements to input the modifications to the dimension configuration or to the filter configuration.

4. The computer system of claim 3, wherein the computer program code further comprises sets of instructions executable by the one or more processors to:
   obtain, from a user via the user interface, the input of the modifications to the dimension configuration or to the filter configuration.

5. The computer system of claim 4, wherein the user interface is presented by a data analytics software application, wherein the generation of the data visualization is performed by the data analytics software application, wherein the data analytics software application is configured to aggregate numerical values of a given measurable dimension for a given categorical dimension when performing the generation of the data visualization unless:
   the given categorical dimension is selected to be included in the data visualization,
   the given categorical dimension is selected to filter at least the portion of the data set, or
   the data visualization is determined to be invalid based on the dimension configuration or the filter configuration.

6. The computer system of claim 1, wherein the data visualization is a bar chart, and wherein the generation of the data visualization includes generating bars in the bar chart for each of the selected dimensions selected to be included in the data visualization.

7. One or more non-transitory computer-readable medium storing computer program code comprising sets of instructions to:

obtain a selection of a data set, the data set comprising a plurality of data fields organized by a plurality of rows and a plurality of dimensions, the plurality of dimensions including measurable dimensions and categorical dimensions, fields within the measurable dimensions containing numerical values, fields within the categorical dimensions containing categorical values, the plurality of dimensions including a version dimension, fields of the version dimension indicating a version of data from among multiple versions of the same data;

obtain a dimension configuration for a data visualization, the dimension configuration indicating zero or more selected dimensions selected from the plurality of dimensions, the selected dimensions selected to be included in the data visualization;

obtain a filter configuration for the data visualization, the filter configuration indicating zero or more filter dimensions selected from the plurality of dimensions, the filter dimensions selected to filter at least a portion of the data set from the data visualization;

determine whether the data visualization is valid or invalid based on:
  a determination that the zero or more filter dimensions include the version dimension,
  a determination that the zero or more selected dimensions include the version dimension, or
  a determination that the zero or more selected dimensions include at least one of the measurable dimensions and that all measurable dimensions of the selected dimensions are restricted to a single version of data from among the multiple versions of the same data;

generate the data visualization in response to a determination that the data visualization is valid; and generate an invalid state notification in response to a determination that the data visualization is invalid, the invalid state notification including text indicating to add the version dimension to the selected dimensions selected to be included in the data visualization, to add the version dimension to the filter dimensions, or to restrict all measurable dimensions of the selected dimensions are restricted to one of the multiple versions.

8. The non-transitory computer-readable medium of claim 7, wherein the computer program code further comprises sets of instructions to:
  obtain modifications to the dimension configuration or to the filter configuration, wherein the modifications:
    add the version dimension to the selected dimensions,
    add the version dimension to the filter dimensions, or
    restrict all measurable dimensions of the selected dimensions to one of the multiple versions; and
  determine that the data visualization is valid based on:
    a determination that the zero or more filter dimensions of the filter configuration as modified include the version dimension,
    a determination that the zero or more selected dimensions of the dimension configuration as modified include the version dimension, or
    a determination that the zero or more selected dimensions of the dimension configuration as modified include at least one of the measurable dimensions and that all measurable dimensions of the selected dimensions are restricted to a single version of data from among the multiple versions of the same data, wherein the generation of the data visualization is performed in response to the determination that the data visualization is valid based on the filter configuration as modified or based on the dimension configuration as modified.

9. The non-transitory computer-readable medium of claim 8, wherein the computer program code further comprises sets of instructions to:
  generate a user interface including the data visualization; and
  generate a configuration panel in the user interface including user interface elements to input the modifications to the dimension configuration or to the filter configuration.

10. The non-transitory computer-readable medium of claim 9, wherein the computer program code further comprises sets of instructions to:
  obtain, from a user via the user interface, the input of the modifications to the dimension configuration or to the filter configuration.

11. The non-transitory computer-readable medium of claim 10, wherein the user interface is presented by a data analytics software application, wherein the generation of the data visualization is performed by the data analytics software application, wherein the data analytics software application is configured to aggregate numerical values of a given measurable dimension for a given categorical dimension when performing the generation of the data visualization unless:
  the given categorical dimension is selected to be included in the data visualization,
  the given categorical dimension is selected to filter at least the portion of the data set, or
  the data visualization is determined to be invalid based on the dimension configuration or the filter configuration.

12. The non-transitory computer-readable medium of claim 7, wherein the data visualization is a bar chart, and wherein the generation of the data visualization includes generating bars in the bar chart for each of the selected dimensions selected to be included in the data visualization.

13. A computer-implemented method, comprising:
  obtaining a selection of a data set, the data set comprising a plurality of data fields organized by a plurality of rows and a plurality of dimensions, the plurality of dimensions including measurable dimensions and categorical dimensions, fields within the measurable dimensions containing numerical values, fields within the categorical dimensions containing categorical values, the plurality of dimensions including a version dimension, fields of the version dimension indicating a version of data from among multiple versions of the same data;
  obtaining a dimension configuration for a data visualization, the dimension configuration indicating zero or more selected dimensions selected from the plurality of dimensions, the selected dimensions selected to be included in the data visualization;
  obtaining a filter configuration for the data visualization, the filter configuration indicating zero or more filter dimensions selected from the plurality of dimensions, the filter dimensions selected to filter at least a portion of the data set from the data visualization;
  determining whether the data visualization is valid or invalid based on:
    a determination that the zero or more filter dimensions include the version dimension,
    a determination that the zero or more selected dimensions include the version dimension, or a determination that the zero or more selected dimensions include at least one of the measurable dimensions and that all measurable dimensions of the selected dimensions are restricted to a single version of data from among the multiple versions of the same data;

generating the data visualization in response to a determination that the data visualization is valid; and generate an invalid state notification in response to a determination that the data visualization is invalid, the invalid state notification including text indicating to add the version dimension to the selected dimensions selected to be included in the data visualization, to add the version dimension to the filter dimensions, or to restrict all measurable dimensions of the selected dimensions are restricted to one of the multiple versions.

14. The computer-implemented method of claim 13, further comprising:

obtaining modifications to the dimension configuration or to the filter configuration, wherein the modifications:
add the version dimension to the selected dimensions, add the version dimension to the filter dimensions, or restrict all measurable dimensions of the selected dimensions to one of the multiple versions; and determining that the data visualization is valid based on:
a determination that the zero or more filter dimensions of the filter configuration as modified include the version dimension,
a determination that the zero or more selected dimensions of the dimension configuration as modified include the version dimension, or
a determination that the zero or more selected dimensions of the dimension configuration as modified include at least one of the measurable dimensions and that all measurable dimensions of the selected dimensions are restricted to a single version of data from among the multiple versions of the same data, wherein the generation of the data visualization is performed in response to the determination that the data visualization is valid based on the filter configuration as modified or based on the dimension configuration as modified.

15. The computer-implemented method of claim 14, further comprising:
generating a user interface including the data visualization;
generating a configuration panel in the user interface including user interface elements to input the modifications to the dimension configuration or to the filter configuration; and
obtaining, from a user via the user interface, the input of the modifications to the dimension configuration or to the filter configuration.

16. The computer-implemented method of claim 15, wherein the user interface is presented by a data analytics software application, wherein the generation of the data visualization is performed by the data analytics software application, wherein the data analytics software application is configured to aggregate numerical values of a given measurable dimension for a given categorical dimension when performing the generation of the data visualization unless:
the given categorical dimension is selected to be included in the data visualization,
the given categorical dimension is selected to filter at least the portion of the data set, or
the data visualization is determined to be invalid based on the dimension configuration or the filter configuration.

17. The computer-implemented method of claim 13, wherein the data visualization is a bar chart, and wherein the generation of the data visualization includes generating bars in the bar chart for each of the selected dimensions selected to be included in the data visualization, and wherein the multiple versions include a forecast version and an actual version of the same data.

* * * * *